Figure 1:
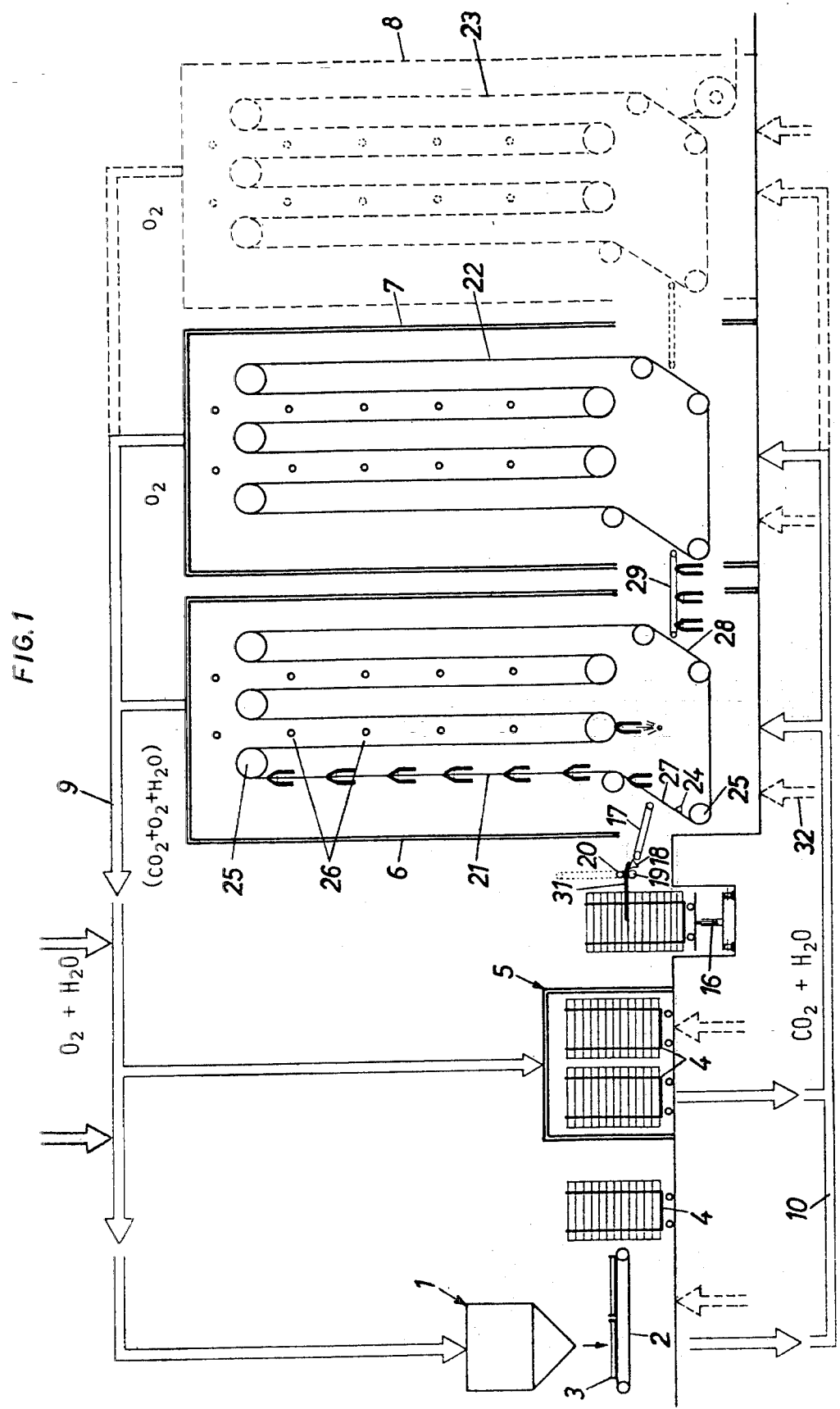

United States Patent [19]

Ruthner

[11] 4,356,664
[45] Nov. 2, 1982

[54] PLANT FOR THE CONTINUOUS PRODUCTION OF GREEN FORAGE

[76] Inventor: Othmar Ruthner, Sieveringerstrasse 150, A-1190 Vienna, Austria

[21] Appl. No.: 211,673

[22] Filed: Dec. 1, 1980

[51] Int. Cl.³ .............................................. A01G 31/00
[52] U.S. Cl. .......................................... 47/65; 47/1.1; 47/17
[58] Field of Search ............................. 47/1.1, 59–65, 47/17

[56] References Cited

U.S. PATENT DOCUMENTS

| | | | |
|---|---|---|---|
| Re. 28,407 | 5/1975 | Kuhn | 47/1.1 |
| 2,121,461 | 6/1938 | Widmann | 47/61 |
| 2,897,631 | 8/1959 | Howsley et al. | 47/60 |
| 3,292,584 | 12/1966 | Brodrick | 47/60 X |
| 3,300,896 | 1/1967 | Lunstroth | 47/59 |
| 3,432,965 | 3/1969 | Smith | 47/62 |
| 3,664,061 | 5/1972 | Oepen | 47/59 |
| 4,003,160 | 1/1977 | Müller | 47/62 X |

FOREIGN PATENT DOCUMENTS

| | | | |
|---|---|---|---|
| 187075 | 12/1955 | Austria . | |
| 1457920 | 12/1976 | United Kingdom | 47/65 |
| 1512606 | 6/1978 | United Kingdom | 47/65 |

*Primary Examiner*—Robert E. Bagwill
*Attorney, Agent, or Firm*—Fleit & Jacobson

[57] ABSTRACT

In a plant for the continuous production of green forage from germinable seeds, the latter are mashed and then carried on trays into a germinating chamber, in which the seeds are treated to form a rootlet mat. This is then carried on revolving endless belts through successive air-conditioned chambers to form green forage. At least one germinating chamber for promoting the formation of a rootlet mat and at least one air-conditioned chamber for promoting the production of green forage or for promoting the formation of stems from the rootlet mat in masses of green forage are connected to a circulating duct for conducting gaseous reactants from one chamber to the other. The trays carrying the seeds in the germinating chamber for the formation of a rootlet mat comprise a frame and one or more carrying grids, which are welded in said frame or loosely held therein and supported to resist sagging.

8 Claims, 5 Drawing Figures

PLANT FOR THE CONTINUOUS PRODUCTION OF GREEN FORAGE

SUMMARY OF INVENTION

In a plant for the continuous production of green forage, mashed germinable seeds are treated in a germinating chamber to form rootlet mats, which are carried on revolving endless belts through air-conditioned chambers to form green forage. The germinating chamber and the air-conditioned chambers are connected to a circulating duct for gaseous reactants.

This invention relates to a plant for the continuous production of green forage from germinable seeds, which are mashed, charged onto trays and introduced into a germinating chamber, in which the seeds are caused to form a rootlet mat, which is caused to form a mass of green forage while carried on revolving endless belts through successive air-conditioned chambers.

The production of green forage as feed or supplemental feed for animals, particularly cows, sheep, horses etc. is very difficult in warm as well as in cold arid climatic zones.

The supply of forage over long distances often depends on the existing infrastructure. In many arid zones it is entirely impossible to produce green forage. In hot arid desert regions, the shortage of water prevents in most cases a production of green forage in the open. Such production is inherently impossible in ice deserts.

Numerous processes have been proposed for the production of malt or green malt from germinable barley which has been steeped. These processes result in the production of an enzyme-containing material, which is used particularly for brewing and in other fields of fermentation technology or foodstuff production.

For instance, Austrian Patent Specification No. 187,075 describes a process for the continuous production of corn. The presteeped seeds are moved by a rotating conveyor screw in a substantially horizontal tube without interruption through germinating and drying zones and while moving in said tube are re-steeped with a controlled supply of air and water and are then permitted to germinate so as to form green malt, which is subsequently dried with hot air. That process is not intended to produce foliage in large quantities.

On the other hand, it is an object of the invention to produce green forage, i.e., a plant material which has a high nutritional value whereas the content of frements or enzymes is less significant.

Specifically, it is an object of the invention to provide an economical plant for a fast growing of green forage within a few days from seeds which can be stored, e.g., from cereal seeds, such as barley. Because barley can be stored under controlled ambient conditions for a long time, amounting to years, that plant can be operated continuously or at any time, e.g., in an emergency.

In a plant of the kind described first hereinbefore that object is accomplished in accordance with the invention in that at least one germinating chamber for promoting the growth of a rootlet mat and at least one air-conditioned chamber for promoting the formation of green leaves or for promoting the formation of stems and lateral shoots from the rootlet mat in masses of green forage are connected to a circulating duct for conducting reactant gases from one chamber to the other, and the seeds are carried in the germinating chamber for the growing of rootlet mats on trays, which comprise a frame and one or more carrying grids, which are welded or loosely held in said frame and supported against sagging.

The mashing and germination involve a release of carbon dioxide and water vapor in large quantities. During the period in which green leaves and stems and lateral shoots are formed as a result of photosynthesis under the action of light, $CO_2$ as well as oxygen are released. This is due to two intercoupled processes in which the carbon dioxide from the mashing and germinating phases as well as the oxygen-enriched air from the growth phase are circulated in dependence on their composition, requirement and analysis. Fresh air can also be supplied at a controlled rate into the gas cycles.

This coupling of the reactant gas systems has mainly the advantage that the gas circulating in the self-contained plant can be maintained at an almost uniform temperature, e.g., 20° to 25° C. so that much energy is saved and the water vapor in the circulating atmosphere is preserved. As a result, the water consumption is favorably influenced. That closed cycle is essential for an economical production which is unaffected by local geographic environmental conditions.

That period in which a breathing process is mainly carried out is divided into a mashing step and a formation of a rootlet mat. This is succeeded by a formation of green leaves and a formation of stems and lateral shoots and can be effected in one or more air-conditioned chambers. In special cases, the formation of stems and lateral shoots can be continued in the open in direct sunlight.

Further details of the invention will be explained more fully with reference to the drawing, which shows by way of example an embodiment of the plant according to the invention.

Figure 2:
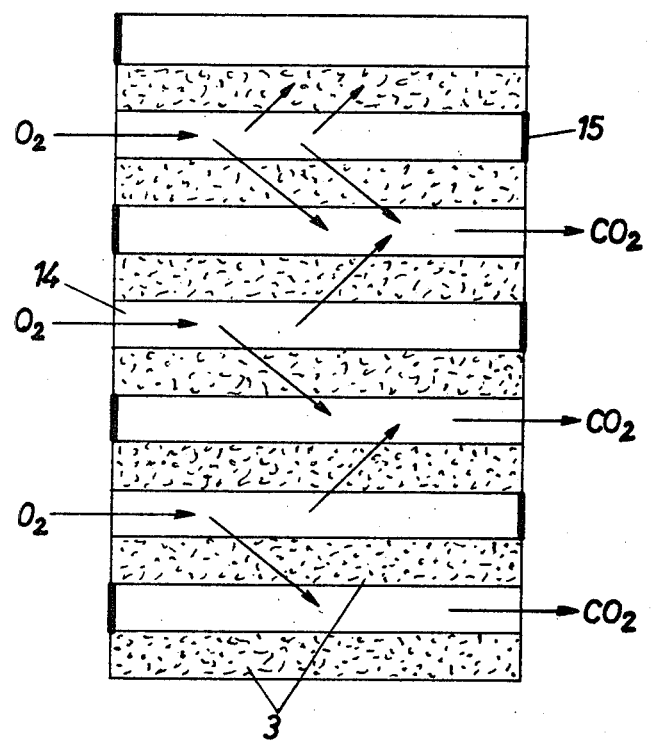
Figure 3:
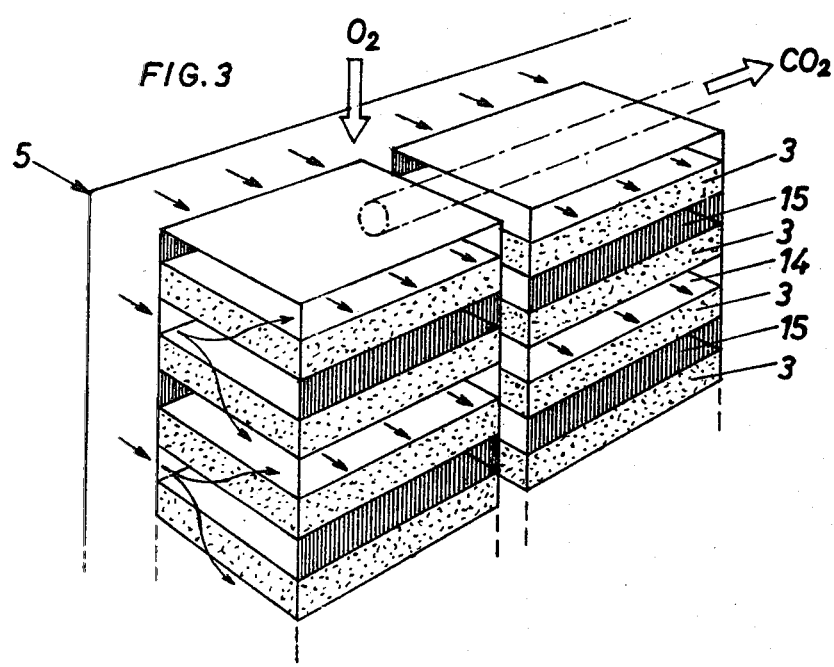
Figure 4:
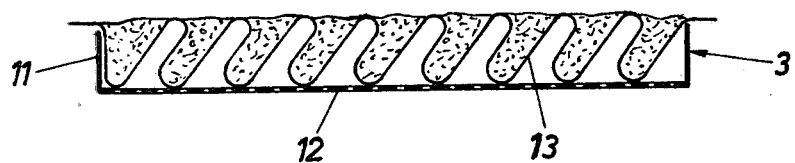
Figure 5:
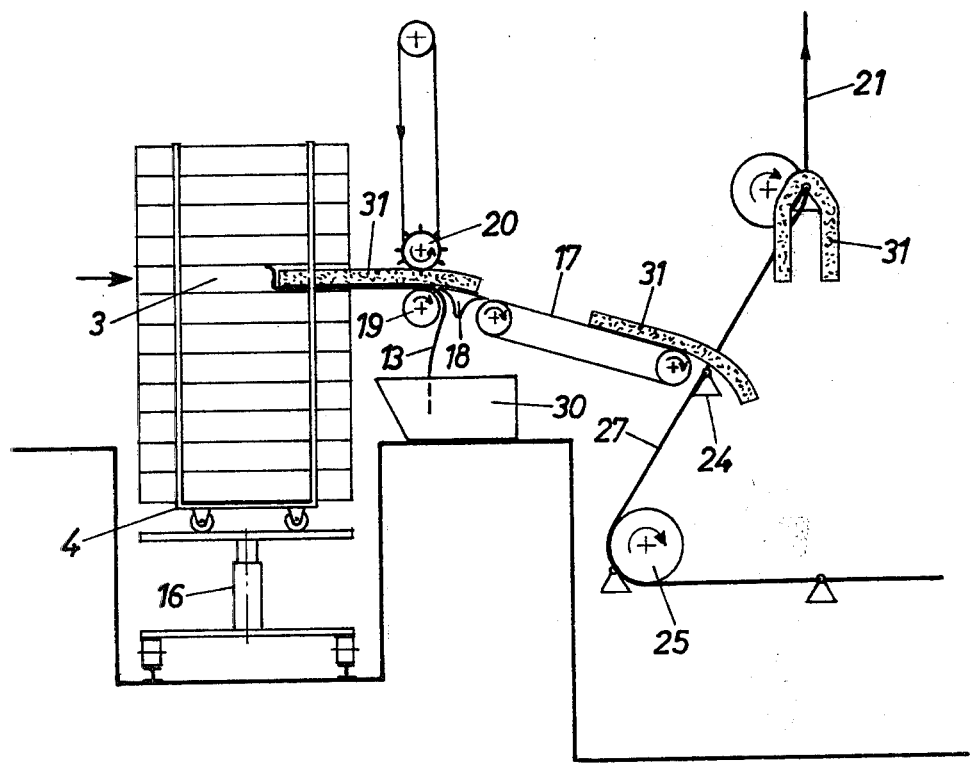

FIG. 1 is a diagrammatic view showing the plant,

FIG. 2 a transverse sectional view showing a stack of trays,

FIG. 3 a perspective view showing two stacks of trays in the germinating chamber, FIG. 4 a transverse sectional view showing an embodiment of a tray, and FIG. 5 an enlarged view showing a detail.

As is apparent from FIG. 1, germinable seeds are held in a hopper 1, which is disposed over a revolving endless belt. Empty trays are placed by a stacking device, not shown, on the belt 2. The filled trays are received by a cart 4, which carries the trays 3 into a germinating chamber 5. The chamber 5 may accommodate a plurality of carts 4 and is intended to promote the formation of a rootlet mat. Two successive air-conditioned chambers 6, 7 are provided to promote the formation of leaves and may be succeeded by a third chamber 8 or additional ones. Each of the air-conditioned chambers 6 to 8 is connected by a duct 9 to the germinating chamber 5 and the hopper 1. A duct 10 leads from the hopper 1 and the chamber 5 back to the chambers 6 to 8. It is apparent that the two ducts 9, 10 connect the hopper 1 and the chambers 5 to 8 in a closed gas cycle.

Each tray 3 comprises a frame 11 in which a bottom grid 12 is welded. Before the seeds are fed to the tray, the bottom grid 12 is covered with an air-permeable sheet 13, which consists, e.g., of paper or a plastic material sieve and may be corrugated, as shown in FIG. 4. In the chamber 5, the trays are mounted in such a manner in the cart 4 that adjacent trays 3 are separated by a space 14. Alternate spaces 14 are closed on opposite ends by flaps 15, which are hinged to the lower edge of the frame 11 so that gases entering a space 14 at one end flow through the overlying and underlying trays and must emerge at the other end from the next upper and next lower spaces 14.

The germinating chamber 5 is succeeded by a lifting platform 16, which can preferably be hydraulically operated and serves to receive the cart 4 coming from the chamber 5. The lifting platform receives the cart 4 when the platform is in an elevated position and is then lowered in steps. One tray 3 is emptied in each position. For this purpose, the lifting platform 16 is disposed near the end of an endless conveyor belt 17, which together with a preceding knife 18 constitutes a table. The table can be tilted upwardly about a roller 19, which is disposed in front of the knife 18. A gripping roller 20, which may be provided with spikes, is disposed over the roller 19 and serves to engage and move the mat 31 lying on the tray 3. A pneumatic or hydraulic ejector, not shown, is disposed on that side of the cart 4 which is opposite to the rollers 19, 20 and serves to push successive trays 3 out of the cart 4 to a stop adjacent to the rollers 19, 20.

Each air-conditioned chamber 6 to 8 contains a revolving endless belt 21, 22 or 23, which is trained around reversing pulleys 25 to form vertical loops and comprises side chains, ropes or the like and spaced apart carriers 24 consisting of triangular-section bars fixed to said chains, ropes or the like. Radiators 26 are disposed between some or all of the ascending and descending cources of the revolving belt 21 to 23 and apply to the growing material the light and heat rays required for its growth. The revolving belt 17 moves along a downwardly inclined path to the revolving belt 21, which just as the succeeding revolving belts 22 and 23 comprises a portion 27 or 28, which receives the growing material and moves along an inwardly inclined path toward the interior of the space traversed by the revolving belt. A transfer belt 29 is provided between the delivering portion 28 of each of two adjacent ones of the revolving belts 21 to 23 and the opposite receiving portion of the other of said two belts and like the revolving belts 21 to 23 consists of an endless belt and comprises carriers 24 but differs from the other belts by being horizontal.

Additional ducts 32 are provided for fresh air and are represented by dotted lines for distinction from the ducts 9, 10.

The plant according to the invention operates as follows: The germinable barley is mashed with water, preferably to the optimum water content, in the hopper 1. Steeping is effected to an optimum water content and initiates the formation of rootlets. The resulting $CO_2$ is included in the circulating gases.

The barley is then poured directly onto the paper sheet or the like on the trays carried by the revolving endless belt 2. To promote the formation of a loosened rootlet mat, one or more additional sheets of paper may be laid between portions of the mashed seeds and will constitute part of the cellulose content of the finished forage. The trays 3 are slid into the frame cart 4 so that they are vertically spaced apart therein.

These filled trays can be thoroughly aerated. Care should be taken to prevent a rise of the reaction temperature above 30° C., preferably 21° to 23° C.

The longitudinal and/or transverse passages thus formed will accelerate breathing and promote the gas exchange $O_2$-$CO_2$ and when the corrugations have been flattened will provide space for a formation of leaves, stems and lateral shoots. To increase the surface area, an improved aeration can be achieved if the mat culture together with the filter and sieve layers is three-dimensional or folded several times or constituted by a plurality of superimposed inclined tiers.

The carts 4 together with the inserted trays 3 are moved into the air-conditioned germinating chamber 5, in which the required temperature and humidity conditions are maintained by a controlled flow or circulating air. Laterally disposed nozzles, not shown, are used to produce moist air mists, which are supplied to the germinating seeds between the trays 3, preferably through the grids and filters. In the germinating chamber 5 the reactant gases must be removed from the rootlet mat as quickly as possible. The germination is continued until the rootlets have intergrown to form a dense mat, which will be self-supporting when it is subsequently vertically suspended. As is apparent from FIG. 2, the air is passed between the trays over and/or through the barley layer. By means of the baffles 15, the air is compelled to flow through the grids 12. For this purpose, a higher air pressure is required or the air must be sucked off. The reaction gases used here must be rich in oxygen and are recovered mainly in the air-conditioned chambers 6 to 8. The gases emerging from the germinating barley and reacting in accordance with the formula $$(CH_2O) + O_2 \rightarrow CO_2 + H_2O$$

contain carbon dioxide and water vapor. Part of the water vapor is used to moisten the germinating barley. The remaining water vapor is fed together with the carbon dioxide to the air-conditioned chambers 6 to 8.

After several days the carts 4 are moved from the germinating chamber 5 to the air-conditioned plant consisting of the air-conditioned chambers 6 to 8 in which green leaves, stems and lateral shoots are formed.

The trays 3 are individually ejected in regular intervals out of the carts 4 as far as to the stop on the level of the roller 19. By means of the spiked roller 20 the rootlet mat and the associated sheet is pulled from the tray 3 and fed to the shearing knife 18. The latter enters between the mat and the sheet and, as is indicated in FIG. 5, deflects the sheet 13 downwardly into a container 30 whereas the mat 31 is moved to the belt conveyor 17. The latter feeds the mat into the first air-conditioned chamber 6, in which green leaves are formed.

As has been mentioned, the plant for making green forage may comprise one air-conditioned chamber 6 or a plurality of air-conditioned chambers 6 to 8, in which the ecological conditions required for the respective growth phases, such as the formation of green leaves and lateral shoots, are maintained. In the plant for making green forage the material is moved on vertical and horizontal paths provided by a circulating system. The short inclined path 27 provided directly at the entrance for the green forage mats ensures that the mats will be centrally received by the carriers 24. The mats are preferably introduced into the air-conditioned chamber through air lock chambers. The carriers 24 or carrying beams are designed to spread apart the portions of the hanging mats so that the rootlets will be thoroughly supplied with air and water. The formation of green leaves and the subsequent formation of stems and lateral shoots is effected on the top of the mat. The mats may be vertically suspended and may be turned through 180°.

The mats are circulated and are regularly supplied with the required water or with a nutrient solution. Artificial and/or natural additional light is used to promote the formation of leaves, stems and lateral shoots. To promote photosynthesis, carbon dioxide from the germinating chamber is fed to these chambers for growing green forage. The respiration is strongly depressed by the compensation effected by the additional light.

The mats are laterally suspended on the circulating carrying beams in such a manner that the mats arranged one behind the other or one beside another supply the requirements for one day. As a result, a culture growing for four days consists of 24 mats of green forage lying one beside another on the carriers. This results in a simple and economical management.

When certain growth phases have been completed (in 3 to 4 days), the suspended mass of green forage is pulled from its supports, preferably by means of a spiked roller, and is disintegrated in forage-chopping plants. In this operation, additives, such as concentrated feed or straw, can be supplied to the mass of green forage in order to provide the required forage. The entire plant may suitably be accommodated in a closed building and is provided with all auxiliaries which are required, such as means for supplying nutrient solution, air-conditioning plant, cleaning and sterilizing means, a water supply system and a measuring and controlling system, so that an operation with a minimum of trouble is ensured.

What is claimed is:

1. A plant for the continuous production of green forage from germinable seeds, comprising means for mashing said seeds, a closed hopper for holding and for steeping mashed seeds, means for charging the mashed seeds onto trays, at least one germinating chamber for promoting the formation of a rootlet mat from the mashed seeds, and at least one air-conditioned chamber for promoting the formation of green leaves and lateral shoots out of the rootlet mat to thereby form a mass of green forage, means for introducing said trays into said at least one germinating chamber in which the rootlet mat is formed from the seeds, a mass of green forage being formed from said rootlet mat as the same is carried on at least one revolving endless belt through said at least one air-conditioned chamber, a first duct for connecting an inlet of said closed hopper and an inlet of said at least one germinating chamber with an outlet of said at least one air-conditioned chamber for conducting reactant gases from said at least one air-conditioned chamber into said closed hopper and said at least one germinating chamber, and a second duct for connecting outlets of said closed hopper and said at least one germinating chamber with an inlet of said at least one air-conditioned chamber for conducting gases from said closed hopper and said at least one germinating chamber to said at least one air-conditioned chamber.

2. A plant as set forth in claim 1, characterized in that each of said trays comprises a frame and at least one carrying grid which is held in said frame and supporting against sagging.

3. A plant according to claim 2, characterized in that said carrying grid is wide-meshed and carries at least one layer of air-permeable material.

4. A plant according to claim 3, characterized in that said layer is corrugated so that the distance between transverse ends of a rootlet mass formed on said layer can subsequently be increased by flattening of said layer.

5. A plant as set forth in claim 1, characterized in that said trays are horizontally arranged and vertically spaced apart in a cart in which they are movable on sliding surfaces.

6. A plant according to claim 5, wherein flaps close alternate vertical spaces between trays spaced apart in the cart so that gases entering one end of a space between two adjacent trays are prevented from exiting the other end of the same space and flow through the underlying and overlying trays before exiting through ends of the next upper and next lower spaces.

7. A plant as set forth in claim 1, characterized in that said trays are horizontally arranged and vertically spaced apart in a cart in which they are movable on profiled roller guides.

8. A plant according to claim 1, further comprising a plurality of air-conditioned chambers, each chamber having a revolving endless belt disposed therein for supporting a rootlet mass during formation of the mass of green forage, and conveyor means disposed between adjacent air-conditioned chambers for transferring rootlet masses from an upstream air-conditioned chamber to a downstream air-conditioned chamber, each of said air-conditioned chambers having an inlet connected to said second duct and an outlet connected to said first duct.

* * * * *